June 24, 1947.    G. F. BENN    2,422,768
SECTION SPOOL CONVEYOR AND DISPENSER
Filed June 16, 1945    2 Sheets-Sheet 1
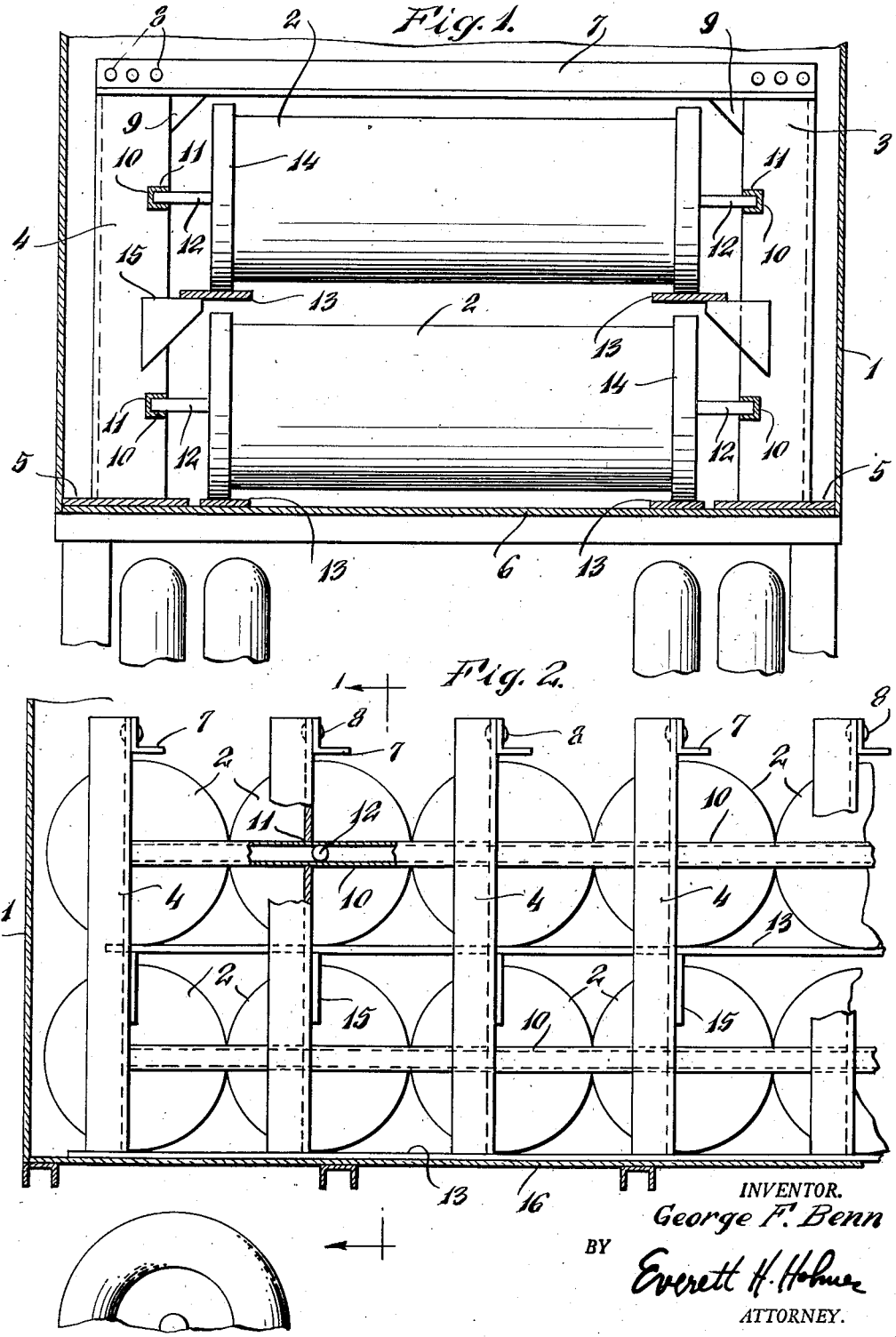
INVENTOR.
George F. Benn
BY
Everett H. Holmes
ATTORNEY.

June 24, 1947.   G. F. BENN   2,422,768
SECTION SPOOL CONVEYOR AND DISPENSER
Filed June 16, 1945   2 Sheets-Sheet 2
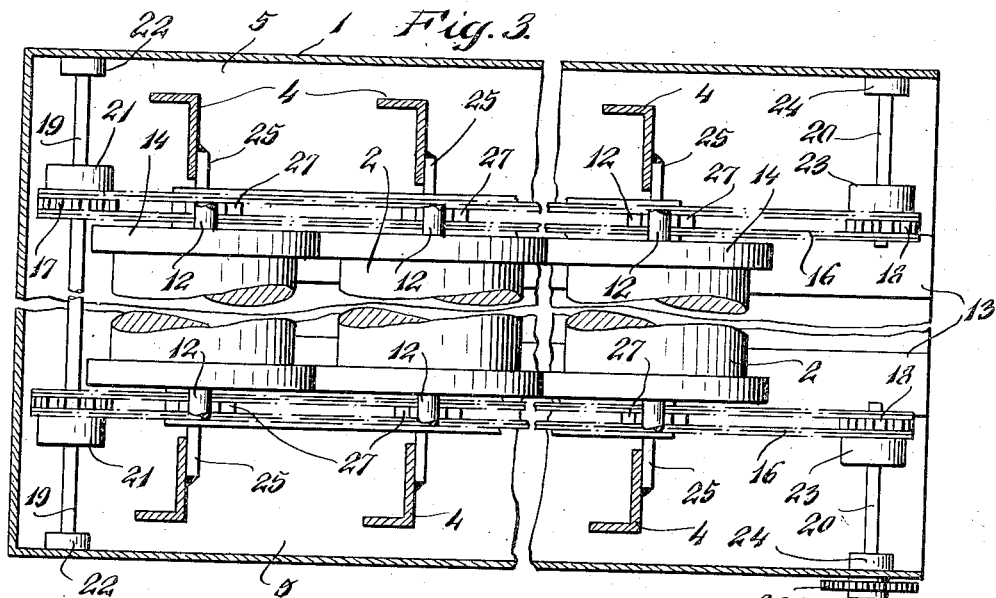
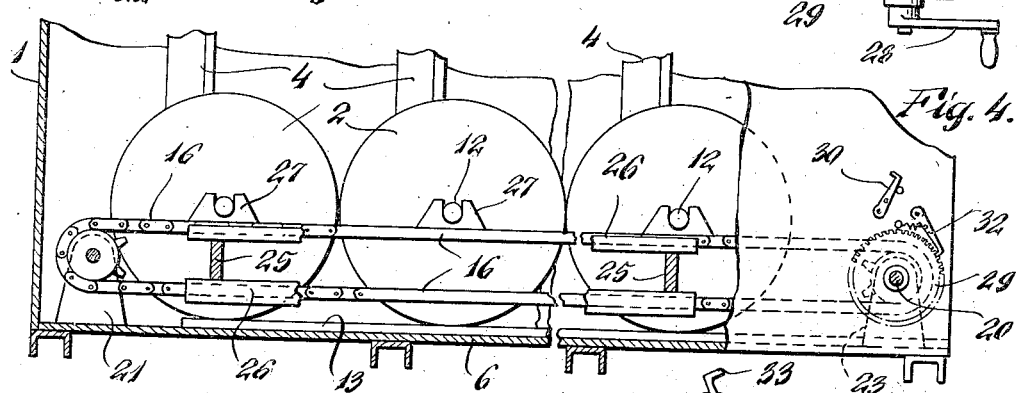
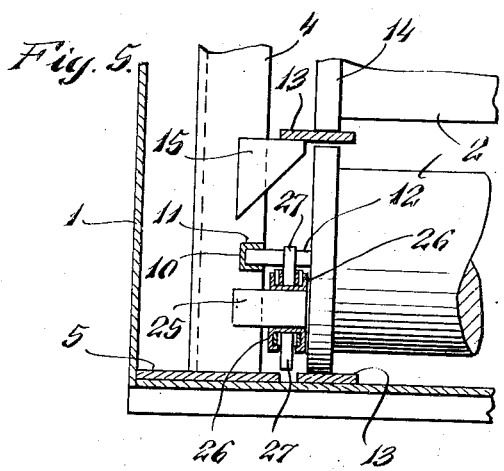
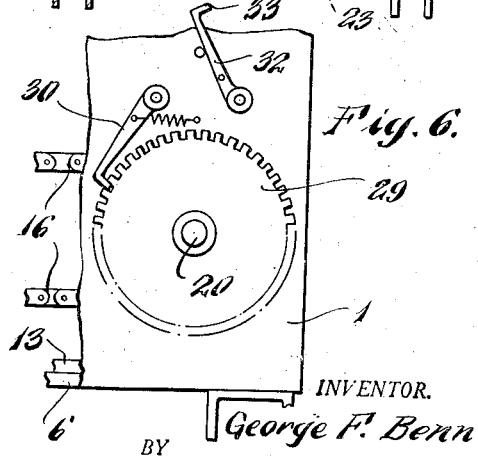
INVENTOR.
George F. Benn
BY Everett H. Hohner
ATTORNEY Patented June 24, 1947

2,422,768

UNITED STATES PATENT OFFICE 2,422,768

SECTION SPOOL CONVEYOR AND DISPENSER

George F. Benn, Greensboro, N. C., assignor to Carter Fabrics Corporation, South Boston, Va., a corporation of North Carolina Application June 16, 1945, Serial No. 599,921

4 Claims. (Cl. 214—83)

1

This invention relates to a spool conveying and dispensing truck which is particularly adapted for carrying spools in a mill. These spools are large and very heavy and it is one object of the invention to provide a truck wherein provision is made for moving a number of spools into or out of the truck one at a time, the spool being arranged in the truck in tiers and the spools of each tier extending transversely of the truck out of contact with each other.

Another object of the invention is to provide a truck having conveyor chains arranged therein at opposite sides of the truck and extending longitudinally of the truck, the chains being provided with members constituting bearings or sockets for receiving axles of the spools and permitting rotation of the spools for rolling movement as they are moved into or out of the truck.

Another object of the invention is to provide the truck with a frame carrying tracks for receiving ends of the spool axles and also carrying means for supporting flights of the endless conveyor chains and thus preventing the chains from sagging and allowing sockets carried by the chains to move out of engagement with the axles of the spools.

Another object of the invention is to provide a truck having therein a frame which is very strong and capable of supporting the weight of a large number of spools.

Another object of the invention is to provide a truck of this character with conveyor chains trained about sprocket wheels carried by shafts so arranged that chains for engaging opposite end portions of the axles of the spools will move at the same rate of speed and both chains driven from a single driving shaft near the open end of the truck.

Another object of the invention is to provide the drive shaft with means for securing the same against unintentional rotation and thus prevent the spools from having rolling movement longitudinally of the truck after being loaded into the truck for transportation from one place to another.

Another object of the invention is to so arrange the shafts carrying the sprocket wheels that while chains at opposite sides of the truck may be moved at the same speed and at the same time the open end of the truck will not be obstructed and spools may, therefore, be readily moved into or out of the truck when loading or unloading the spools.

Another object of this invention is to provide a spool carrying truck which is of simple con-

2 struction, very strong, and capable of being easily operated when in use.

The invention is illustrated in the accompanying drawings wherein

Figure 1 is a view taken transversely through the truck along the line 1—1 of Figure 2;

Figure 2 is a sectional view taken longitudinally through the truck in a vertical plane;

Figure 3 is a sectional view taken longitudinally through the truck in a horizontal plane;

Figure 4 is a view showing a portion of the truck in longitudinal section and the spool carrying frame in side elevation;

Figure 5 is a view showing a side portion of the truck in vertical transverse section; and Figure 6 is a fragmentary view showing the mechanism for preventing unintentional movement of the conveyor chains.

The truck 1 shown in the accompanying drawings is of conventional construction and while it has been shown of such size that it will accommodate two tiers of spools 2 it will be understood that it may be of a height to permit additional tiers of spools to be loaded if so desired. Within the body of the truck is erected a frame 3 having vertically disposed side standards 4 which are spaced from each other longitudinally of the truck and formed from lengths of single iron. Strips of metal 5 extend longitudinally of the truck at opposite sides of the floor 6 thereof and upon these strips lower ends of the standards are secured so that each strip 5 serves as a base for the standards resting thereon and causes the weight to be distributed throughout the length of the truck. Cross bars 7 extend between upper ends of the standards to brace the standards and these cross bars are secured by bolts 8 and reinforced by corner webs 9. Guides 10 formed of channel metal extend longitudinally of the frame and are mounted through recesses 11 formed in inner side edges of the standards. The guides are open along their inner sides to receive ends of the axles or shafts 12 of the spools 2 and in order to support the spools for rolling movement there have been provided tracks or runner plates 13 formed from metal strips of such width that the heads 14 at ends of the spools will have ample room to rest upon the tracks. The lower tracks rest upon the floor of the truck but the upper tracks are carried by brackets 15 carried by and projecting inwardly from the standards. It will thus be seen that the spools may be rolled along the tracks into or out of the truck and that when they are in the truck they will be arranged in tiers one above another, the spools of each tier extending transversely of the track one after another from the open rear end of the truck to the front end thereof. These spools are very heavy but since they are carried by the frame 3 which extends the full length of the truck body their weight will be evenly distributed and a well balanced load provided.

In order to move the spools along the tracks of the frame there have been provided conveyor chains 16 trained about sprocket wheels 17 and 18 carried by shafts 19 and 20. The shaft 19 at the front end of the truck body extends the full width thereof and is rotatably mounted through bearing posts 21 with its end portions projecting therefrom and engaged in bearings 22 carried by side walls of the truck body. The shafts 20 are also mounted through bearing posts 23 and engaged in bearing 24, separate shafts 20 being used at the rear end of the frame since this end of the frame and the rear end of the truck body are open and a continuous shaft across the rear end of the frame would interfere with movement of spools into and out of the truck body. Arms 25 extends inwardly from certain of the standards and carry strips of channel metal 26 which extend substantially the full length of the frame and constitute guides for supporting flights of the chains and preventing the chains from sagging. Cleats 27 serving as sockets for reception of the axles or shafts 12 of the spools are carried by certain of the links of the chains and these cleats are so spaced from each other that spools having their shafts engaged in the sockets will be spaced slightly from each other and allowed to roll freely along the tracks 13. The sprocket wheels are fixed to the shafts and when one shaft 20 is turned the shafts will all be turned at the same speed and the chains also move at the same speed. Therefore, the spools will be rolled along the tracks at even speed and successively moved into or out of the truck body through the open rear end thereof.

In order to turn one shaft 20 as a drive shaft there has been provided a crank handle 28 engaged with an end portion of the shaft which protrudes through a side wall of the truck body. A ratchet wheel 29 is fixed to the shaft and engaged by a pawl or dog 30 which is pivoted to the side wall of the truck body and urged towards the ratchet by a spring 31. There has also been provided a latch 32 pivoted to the truck body for pivotal movement into and out of position for its bill 33 to engage the ratchet and assist in preventing retrograde rotation of the shaft to which the ratchet is fixed. When the latch is swung upwardly to the inoperative position and rests against the abutment pin 34 the pawl 30 may be moved out of engagement with the ratchet and the shaft then turned in a direction to move the spools towards the open rear end of the truck and the spools will be successively discharged from the truck.

Having thus described the invention, what is claimed is:

1. A vehicle having a body open at its rear end, a frame in said body extending longitudinally therein and having side standards and transversely extending cross bars secured at their ends to upper ends of the standards, flat strips extending longitudinally of the frame inwardly of the standards and constituting tracks for engaging under ends of spools and mounting the spools for rolling movement longitudinally of the frame into and out of the body through the open rear end thereof, strips of channel metal carried by said standards at inner side edges thereof and open along their inner sides for receiving ends of shafts of the spools, a shaft rotatably mounted across the front end of said frame, shafts rotatably mounted between side walls of the body and opposite sides of the rear end of the frame, one of the last mentioned shafts constituting a drive shaft, sprocket wheels carried by said shafts, sprocket chains extending longitudinally of the frame and trained about the sprocket wheels, socket members carried by said chains for receiving shafts of spools and rolling the spools along the tracks as the chains are moved, guide strips extending longitudinally of said frame inwardly of the standards and engaging the chains to support the chains against sagging and prevent misplacement of the socket members from shafts of the spools, a ratchet wheel carried by the drive shaft, a pawl pivotally mounted and yieldably held in engagement with the ratchet wheel, and a latch movable into and out of engagement with the ratchet wheel.

2. A vehicle having a body open at its rear end, a frame in said body having standards at opposite sides spaced from each other longitudinally of the frame, tracks consisting of flat strips extending longitudinally in said frame to support spools for rolling movement, channel-shaped strips carried by said standards and extending longitudinally of the frame above said tracks for receiving ends of shafts of the spools, a shaft rotatably mounted across the front end of said frame, shafts rotatably mounted between side walls of the body and opposite sides of the rear end of the frame, one of the rear shafts projecting outwardly through a side wall of the body and constituting a drive shaft, sprocket wheels fixed to said shafts, chains extending longitudinally of the frame at opposite sides thereof and trained about the sprocket wheels, cleats carried by said chains and having open sockets for rotatably receiving the shafts of the spools, guides extending longitudinally of the frame for engagement by the chains to hold the cleats in engagement with the shafts of the spools, means for rotating said drive shaft, and means for releasably holding the drive shaft against rotation in one direction.

3. A vehicle having a body open at its rear end, a frame in said body having vertical standards at opposite sides spaced from each other longitudinally of the frame, brackets extending inwardly from said standards, flat strips carried by said brackets and constituting tracks extending longitudinally in said frame for supporting spools in the frame, channeled guides extending longitudinally in said frame for receiving ends of shafts of spools resting upon said tracks, a shaft rotatably mounted across the front end of said frame, shafts rotatably mounted between side walls of the body and opposite sides of the rear end of the frame, one of the rear shafts constituting a drive shaft, sprocket wheels carried by said shafts, chains extending longitudinally of the frame at opposite sides thereof and trained about the sprocket wheels, and members carried by said chains formed with open sockets for receiving shafts of the spools and causing the spools to be rolled along the tracks during movement of the chains.

4. A vehicle having a body open at its rear end, a frame in said body open at its rear end, flat strips extending longitudinally in said frame at opposite sides thereof and constituting tracks for supporting spools, channeled guides extending longitudinally in said frame at opposite sides thereof above said tracks for rotatably receiving ends of shafts of spools resting upon said tracks, shafts rotatably mounted at the front end of the frame and at opposite sides of the rear end of the frame, sprocket wheels carried by said shafts, endless chains extending longitudinally of said frame and trained about said sprockets, and members carried by said chains for rotatably receiving shafts of the spools.

GEORGE F. BENN.

REFERENCES CITED

The following references are of record in the file of this patent:

UNITED STATES PATENTS

| Number | Name | Date |
|---|---|---|
| 1,333,180 | Lewis | Mar. 9, 1920 |
| 1,696,801 | Howard | Dec. 25, 1928 |
| 2,335,517 | Koonce | Nov. 30, 1943 |
| 2,335,518 | Koonce | Nov. 30, 1943 |

FOREIGN PATENTS

| Number | Country | Date |
|---|---|---|
| 253,604 | Germany | Mar. 8, 1912 |
| 509,860 | France | Nov. 22, 1920 |